(12) United States Patent
Barland

(10) Patent No.: US 11,226,018 B2
(45) Date of Patent: Jan. 18, 2022

(54) CALIPER COVER WITH BIASLY ENGAGED MOUNTS

(71) Applicant: Michael Barland, Chula Vista, CA (US)

(72) Inventor: Michael Barland, Chula Vista, CA (US)

(*) Notice: Subject to any disclaimer, the term of this patent is extended or adjusted under 35 U.S.C. 154(b) by 0 days.

(21) Appl. No.: 16/667,500

(22) Filed: Oct. 29, 2019

(65) Prior Publication Data

US 2020/0132138 A1 Apr. 30, 2020

Related U.S. Application Data

(60) Provisional application No. 62/752,138, filed on Oct. 29, 2018.

(51) Int. Cl.
| | | |
|---|---|---|
| F16D 65/847 | (2006.01) | |
| F16D 55/225 | (2006.01) | |
| F16D 65/00 | (2006.01) | |
| F16D 55/00 | (2006.01) | |

(52) U.S. Cl.
CPC ....... F16D 55/225 (2013.01); F16D 65/0068 (2013.01); F16D 2055/002 (2013.01)

(58) Field of Classification Search
CPC .... F16D 55/22; F16D 55/225; F16D 65/0068; F16D 65/0081; F16D 65/847
USPC ........... 188/18 A, 73.1, 73.31, 73.32, 188/73.36–73.38, 206, 218 A, 218 R, 188/264 A; D12/180
See application file for complete search history.

(56) References Cited

U.S. PATENT DOCUMENTS

| | | | | |
|---|---|---|---|---|
| 2009/0321198 A1* | 12/2009 | Barland | .............. | F16D 65/0031 188/264 A |
| 2018/0080512 A1* | 3/2018 | Barland | .............. | F16D 65/0081 |
| 2019/0338815 A1* | 11/2019 | Park | ................... | F16D 65/0081 |
| 2020/0132138 A1* | 4/2020 | Barland | ................ | F16D 55/225 |

* cited by examiner

*Primary Examiner* — Christopher P Schwartz
(74) *Attorney, Agent, or Firm* — Donn K. Harms

(57) ABSTRACT

A caliper cover has a first mount and a second mount which are configured to engage with opposing sides of a brake caliper. A cover is engaged to the first and second mounts with a pair of struts extending between the mounts and the cover. Each mount is configured for engagement to the caliper without tools through a sliding to a preliminary position and then by imparting pressure to flex the body of the mount to expand and compress upon opposite sides of the brake caliper.

12 Claims, 17 Drawing Sheets

CALIPER COVER WITH BIASLY ENGAGED MOUNTS

This application claims priority to U.S. Provisional patent application Ser. No. 62/752,138, filed on Oct. 29, 2019, which is incorporated herein in its entirety by this reference thereto.

FIELD OF THE INVENTION

The disclosed device concerns brake calipers employed on motor vehicles such as cars and trucks. More particularly, the device relates to a mounting system employing one or preferably a pair of slidably engageable mounts which are configured to deflect during mounting and then form a compressive engagement in positions upon a vehicle brake caliper.

BACKGROUND OF THE INVENTION

Motor vehicles, due to their ability to accelerate and maintain motion, at both slow and high speeds, have always required components configured to slow the vehicle when needed. Conventionally, two types of brake systems have developed for slowing and stopping vehicles. In decades past, drum brakes were employed on each of the vehicle wheels which uses friction caused by a set of opposing shoes or pads when they press outward against a rotating cylinder-shaped drum to which the wheel is engaged. Drum brake systems are limited in the force they may impart to the wheel and modernly a second mode of wheel braking developed. This new and widely employed configuration for vehicle braking employs planar rotors which can be varied in size and area on which calipers compress opposing pads upon the rotor engaged with the wheel.

As can be discerned, caliper braking has proven to be a significant improvement over drum brakes and is conventionally employed on at least the front wheels of modern autos and trucks and on airplanes and other vehicles in need of dependable stopping power. In use, the two opposing pads are compressed by hydraulic force of the caliper, against the perimeter of the rotor engaged to the axle of the wheel which the rotors brake. In use, a pressing of the brake pedal on the vehicle communicates hydraulic pressure to the caliper holding the opposing pads and causes them to compress against opposing sides of the planar rotor thereby slowing the wheels and the vehicle.

While caliper braking systems with opposing pads in such disk brake systems improves braking, there are a number of problems associated with such systems from the standpoint of the vehicle owner. Unlike drum brakes, which are hidden within a wheel drum and which tend to prevent dust from the brake pads from contacting the wheel rim, calipers inherently eject brake pad dust onto the wheel and caliper during use. This dust is the byproduct of the frictional engagement of the brake pads with the spinning rotor during stopping of the wheel. While functionally, such is generally not a serious problem, most drivers consider the brake dust unsightly on the caliper when viewed through holes in the wheel. Further, many drivers consider the caliper itself unsightly.

Other problems associated with braking systems employing calipers and rotors are heat generation from the frictional engagement of the brake discs with the rotor and, additionally, the communication of the dust from the brake pads not only to the caliper, but to a sticky engagement upon the wheels and surface of the car and surrounding wheel.

Prior solutions in the art, with regard to the caliper dust problem, employed covers for the calipers in an attempt to hide them from view and to limit dust communication. However, previous caliper covers generally glue to the caliper which is unsafe and hard to remove or provide for a single mount with no adjustment for the cover closer or further from the wheel. Additionally, some such covers require the removal of the caliper from its mount and the employment of special tools and mounting components to provide a mount for the caliper cover.

Removing the caliper is beyond the scope of most owner's skills and tool collections. Other caliper covers have been disclosed using connectors engaging pins holding the pads of the caliper.

Provided herein is a caliper cover mounting system which provides mounts which are configured for an easy deflecting or sliding engagement onto existing calipers. The mounts are configured with a leading end which is configured to flex and slide upon a distal edge contacting an exterior surface of the caliper as the clip slides. A trailing end of the clip is configured to curve under a first side of the body of the caliper in a gap between the rotor and the caliper body. The trailing end during such translation will slide into this gap for a distance during installation whereupon the device and leading end may be temporarily flexed, to then curve around a second side of the body of the caliper and into a second gap between the caliper and rotor.

The body of the mount on a facing surface which contacts the body of the caliper during installation has a shape which mirrors or is complementary to the shape of the exterior surface of the housing of the caliper upon which it is to engage. The result being that the distal edge of the leading end of the clip may be deflected and then slid upon the exterior of the housing of the caliper and the trailing end will begin to slide under and engage the first side of the body of the caliper prior to the leading end reaching the second side of the body of the caliper.

The clip body is formed of flexible material with a memory or spring like ability to flex and return to an original shape. As the C-shaped trailing end of the clip body reaches a contact of the facing surface with the housing of the caliper, the leading end is positioned such that force upon the mid portion of the body of the clip will cause the leading end to deflect and engage around the second end of the housing of the caliper and into the second gap. Concurrently, because the facing surface of the clip body mirrors or is complementary to the shape of the exterior of the caliper housing, a biased contact is achieved with the leading end and trailing end forming a biased engagement of the body of the clip, with the housing of the caliper, and with both the first and second ends.

In the central portion of the body forming the clip, in between the leading end and trailing end, is positioned either a screw or bolt or similar user engageable connector or an aperture adapted to engage such a connector. The connector is employed to form a removable engagement between a support member extending from a cover plate and thereby hold the caliper cover plate operatively positioned adjacent an exposed side of the caliper and running substantially parallel to the rotor.

Slots in the support member may be provided to allow translation during engagement in two or four directions to allow the user to adjust the distance of the cover plate from the side of the caliper, as well as center the cover plate by sliding in a plate between the leading end and trailing end. This adjustment and removable engagement to allow such is most important to allow the user to adjust the position of the cover to keep it form contacting the wheel surfaces which hold the tire.

SUMMARY OF THE INVENTION

The device as herein disclosed and described provides a caliper cover system which includes one, or more preferably two mounts, which are configured to provide a sliding positioning upon the housing of the caliper which results in a compressive engagement of each mount upon a shoulder portion of the housing of the caliper. The mounts are configured with studs to removably engage with struts extending from a cover plate preferably in a manner allowing for a sliding positioning of the cover plate both sideways and toward and away from the side of the caliper housing adjacent which the cover plate is located.

Each mount features a body which is formed of spring steel or metal or other material which has a memory and will flex during installation but return to a non-flexed shape once the sliding installation of the mount is completed.

The mounts are configured with a body having a leading end and a body adapted to flex to allow a gap distance between the leading end and trailing ends, to temporarily increase and thereby allow the distal edge of the leading end to slide on an exterior surface of the housing of the caliper as the mount slides. To accomplish this sliding installation, the trailing end of the body of the mount is configured in a curved shape adapted to have a portion thereof slide under a first side of the body of the housing of the caliper in a gap between the rotor and the caliper housing.

During this sliding installation of the mount, the trailing end of the body of the mount will slide into this gap for a distance, whereupon the leading end of the body of the mount may be temporarily flexed to allow it to slide past the edge of the second side of the housing of the caliper. During this flexed positioning, this leading end of the body of the mount will deflect from an angle and will then engage the second side of the housing of the caliper by flexing back to the normal configuration. This causes the leading end to curve around a second side of the body of the caliper housing and into a second gap between the caliper housing and a rotor therein.

Preferably, a gap between a first contacting surface of the mount on the trailing end, and a second contacting surface of the mount on the leading end, and the body therebetween, is equal to or just slightly less than a distance between the points on opposing sides of the housing of the caliper to which the trailing end and leading end engage. This allows the body of the mount to achieve a biased or compressive engagement upon a shoulder portion of the caliper housing and an especially secure mount thereon.

The facing surface of the body of the mount, which contacts against the exterior surface of the housing of the caliper, has a shape and dimensions which mirror or are complementary to the shape of the exterior surface of the housing of the caliper upon which it is to engage.

Further, preferably the shape of the leading end of each mount, and a gap distance thereof from the trailing end thereof, is such that during sliding to install the mount, the body of the mount will flex and allow the leading end to project and engage over the second end of the housing of the caliper. Currently, the curved C-shape of the trailing end, which has a longer edge than the curved edge of the leading end will slide onto and engage the first end of the housing of the caliper.

This configuration allows the distal edge of the leading edge on the body of the mount to contact against and be slid along the exterior surface of the housing of the caliper. Concurrently, the trailing end slides under and engages with the first side of the body of the caliper prior to the leading end reaching the second side of the body of the caliper.

The mount body is, as noted, formed of flexible material with a memory or spring like ability, to flex and return to an original shape. As the C-shaped trailing end of the mount body reaches a contact of the facing surface with the housing of the caliper, the leading end is positioned such that force upon the mid portion of the body of the mount will cause the angle of the leading end to deflect and then engage around the second end of the housing of the caliper and into the second gap. Concurrently, because the facing surface of the mount body mirrors or is complementary to the shape of the exterior of the caliper housing, a biased contact is achieved with the leading end and trailing end and a compressive engagement of the body of the mount, with the housing of the caliper, and with both the first and second ends is formed.

In the central portion of the body forming the mount, in between the leading end and trailing end, is positioned either a screw or bolt or similar removably engageable connector or an aperture adapted to engage with such a connector. The connector is employed to form a removable engagement between a support member extending from a cover plate and thereby holds the caliper cover plate operatively positioned adjacent an exposed side of the caliper and running substantially parallel to the rotor. Slots in the support member can be provided to allow translation during engagement in two or four directions to allow the user to adjust the distance of the cover plate from the side of the caliper, as well as center the cover plate by sliding in a plate between the leading end and trailing end. This adjustment and removable engagement to allow such is most important to allow the user to adjust the position of the cover to keep it from contacting the wheel surfaces which hold the tire.

The shape of the body of the mount, and the shape and elongation of the C-shaped trailing end, and that of the leading end form the body to a complementary or mirrored configuration of the exterior surface of the housing of the rotor to which the mount compressively engages. This shape, as can be discerned, changes to form the body of the mount to the dimensions and shape of the housing of the caliper to which it engages. In all modes, however, this shape is such that the mount may be slid and flexed to form the compressive engagement as noted herein.

The caliper cover system herein includes two removably engageable mounts. Each of these mounts extending from the cover, are configured for engagement with two respective support mounts attached to opposite sides of a caliper cover. Preferably, the support members or struts are configured for adjustability both for distance of the cover plate from the caliper housing as well as for back and forth translation to center the cover on the caliper housing and/or to move it away from contact with a wheel.

It is, thus, an object of this invention to provide a caliper cover system which employs two mounts which will slide onto the caliper housing and then flex to thereby form to a compressive engagement thereon.

With respect to the above description and background, before explaining at least one preferred embodiment of the invention in detail, it is to be understood that the invention is not limited in its application to the details of construction and to the arrangement of the components and/or steps set forth in the following description or illustrated in the drawings. The various apparatus and methods of the invention herein described and disclosed are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing other devices, methods and systems for carrying out the several purposes of the present disclosed device for providing an easily mounted yet securely engaged caliper cover. It is important, therefore, that the objects and claims be regarded as including such equivalent construction and methodology, insofar as they do not depart from the spirit and scope of the present invention.

DETAILED DESCRIPTION OF PREFERRED EMBODIMENTS

Figure 1:
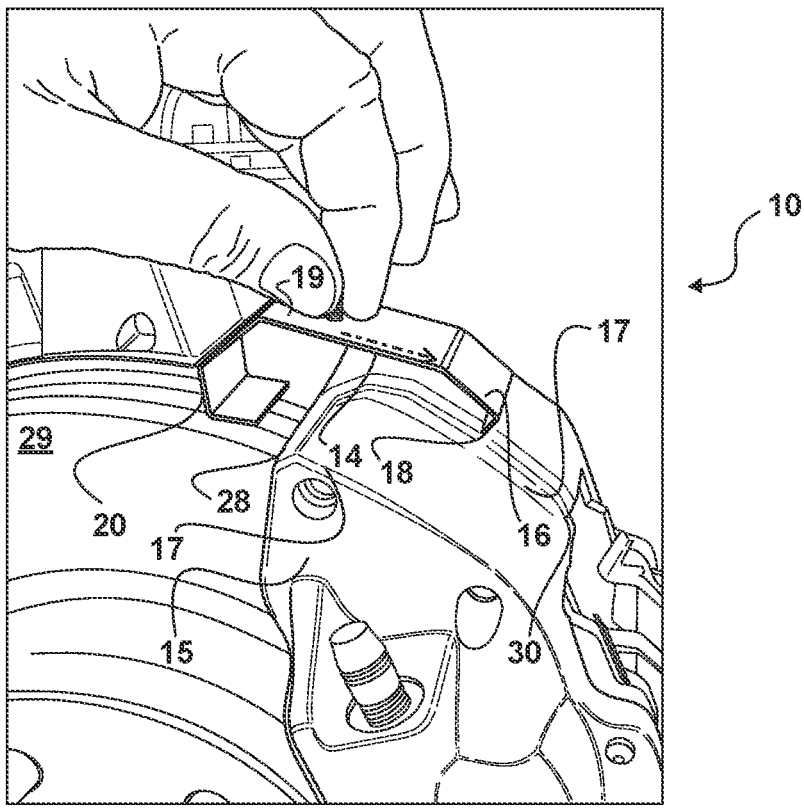
FIG. 1 show the sliding installation provided by the configuration of the mount of the caliper cover system herein, showing the leading end sliding upon the housing of the caliper to a preliminary mounting position thereon, and the trailing end sliding toward engagement with a first side of the caliper housing.

Referring now to the drawings in FIGS. 1-19, wherein similar parts of the caliper cover with slidingly engageable mounts are identified by like reference numerals. In all modes of the device 10, as shown in FIGS. 1-5, a body 12 is configured with a shape and contour to form a contact surface 13 of the body 12. This contact surface 13 is substantially complementary in shape or a mirror image of the exterior of a first shoulder portion 17 and a second shoulder portion 21 of a caliper housing 15 on which the body 12 of each mount 14 is to respectively compressibly engage.

Figure 6:
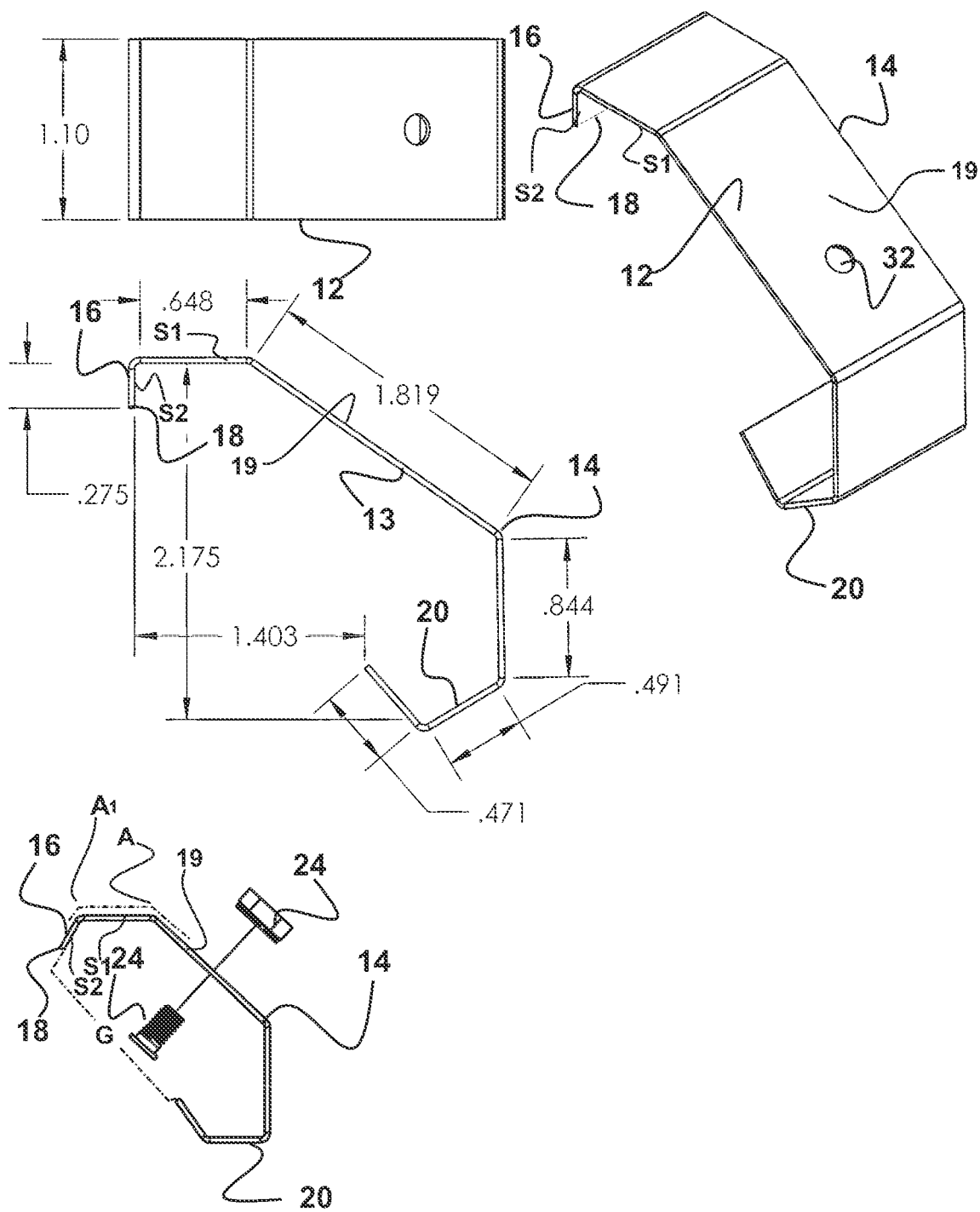
FIG. 6 shows multiple views of a first and typical configuration for the mount herein which is configured for sliding to a compressed engagement onto a caliper housing showing the leading end shaped to slide upon the housing until the trailing end contacts the caliper whereupon the mount is flexed to deflect the leading end momentarily to achieve the compressive engagement, and showing the engageable connector.

As shown, for example, in FIGS. 1-4, and common in all modes of the device 10 herein, the body 12 of the mount 14 is configured with a trailing end 20 opposite a leading end 16 which extend from opposite sides of a central portion. A distal edge 18 is positioned on the end of the leading end 16. This leading end 16 preferably has one or a plurality of angles of the body therein between the mid or central portion 19 and the distal edge 18, which is positioned across a gap G a distance from the trailing end 20 (FIG. 6).

Figure 5:
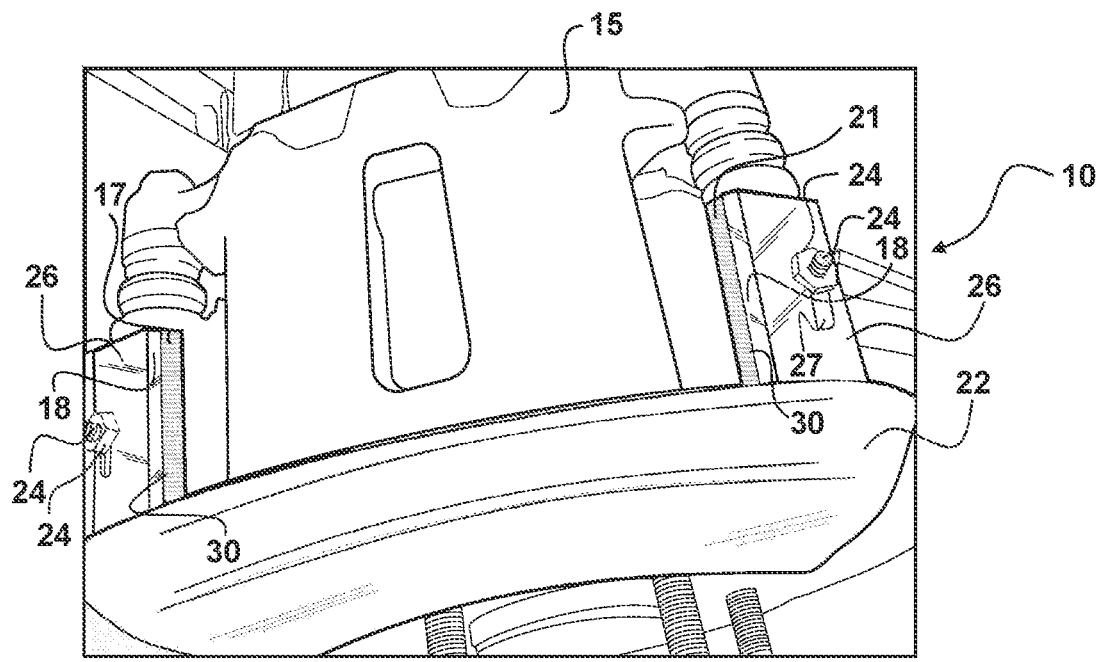
FIG. 5 depicts the installation of the cover plate, subsequent to positioning two mounts by sliding them into respective engagements on the housing of the caliper showing a connector engaged with each support member holding the cover plate.
Figure 5A:
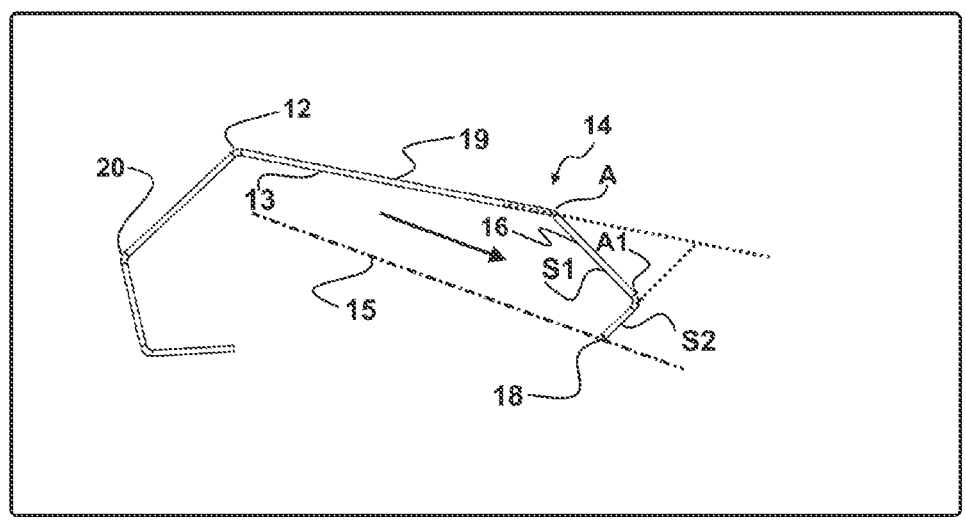
FIG. 5A depicts a side view of the sliding mounting action of FIG. 1, showing the body section extending from an angle point A1 at one end of the central portion 19 to the distal edge 18 of the mount 14. This body section S2, for example, preferably runs at an angle A1 less than ninety degrees relative to the central portion 19 of the body 12 forming the device 10 thereby allowing it to slide easier to the preliminary mounting position, and to form a compressive contact against the second end 30 of the caliper 15, once mounted.

During mounting of either of the two mounts 14 to respective engagements on either the first shoulder portion 17 or the second shoulder portion 21 of a caliper 15, with the mount in a preliminary mounting position as in FIG. 1 or FIG. 5A for example, when the body 12 is flexed at the central portion 19, the leading end 16 portion extending to the distal edge 18 flexes along with the central portion 19. This flexing actuated by pressure exerted to the body 12 in a direction toward the caliper 15 will enlarge the gap "G" such as shown in FIG. 6, and allow the distal edge 18 of the mount 14 to slide over the second end 30 of the respective shoulder 17 OR 21 of the caliper 15 and into an engagement upon of the distal edge 18 the respective second end 30 of either the first shoulder portion 17 or second should portion 21 of the caliper 15. This actuation from the positioning the preliminary mount to the mounted position with a shoulder portion 17 or 21 of the caliper 15, is actuated in the same fashion in all modes of the device 10 depicted herein.

This distal edge 18 extending from the central portion 19 at the leading end 16 of the body 12 is actuated by pressure imparted upon the body 12 to deflect the distal edge 18 a direction away from the trailing end 20. This temporarily enlarges the gap between them thereby actuating the distal edge 18 of the device 10 in the preliminary mounting position, to slide upon a second end 30 of the housing of the caliper 15 as the body 12 of the mount 14 is concurrently slid into engagement with the opposite first end 28. Such occurs when the device 10 is slid as in FIG. 1 to the preliminary mounting position, and then flexed by imparting pressure to the central portion 19 in a direction toward the top of caliper 15 as in FIGS. 2-4.

Figure 2:
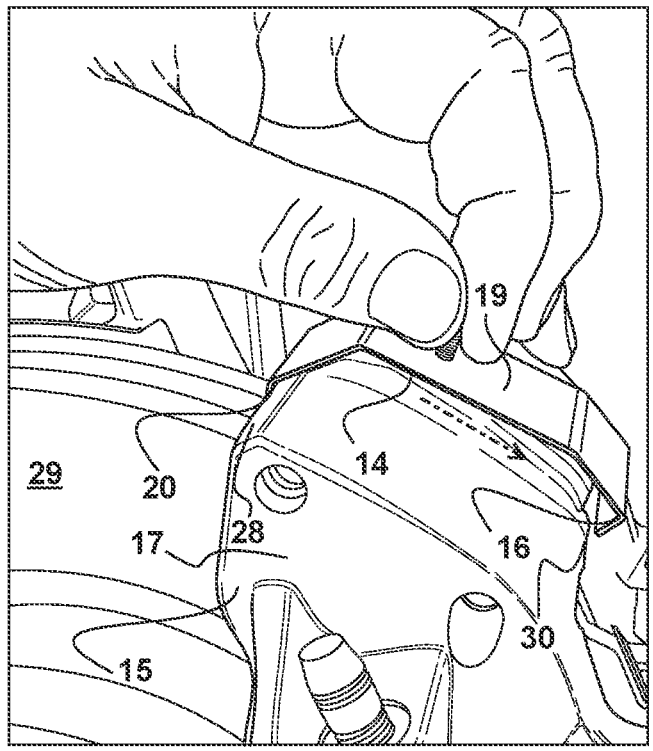
FIG. 2 shows the sliding installation at a preliminary mount position, where the trailing end is adjacent or contacts a first side of the caliper housing and a distal edge of the leading end is contacting the top surface of the housing adjacent an opposing second thereof.

As can be seen in FIG. 2, during this sliding engagement to the preliminary position and an engaged position, the trailing end 20 of the mount 14 is substantially C-shaped. As such sliding the device 10 to a preliminary mounting position with the trailing end 20 adjacent to or in contact with a first end 28 of caliper 15 positions the distal edge 18 of the leading end 16 adjacent to but not past the second end of the housing of the caliper 15. As noted, from this preliminary mounting position, the device 10 can be moved to an engaged position with the caliper 15 by exerting pressure against the body 12 of the mount 14 in a direction toward the caliper 15.

The trailing end 20, as noted, is substantially C-shaped. By substantially C-shaped is meant that the trailing end 20 extends in a curve or angular linear sections from the central portion 19, to form the shape of the letter C. Any number of angled portions or curved areas may be employed.

Figure 3:
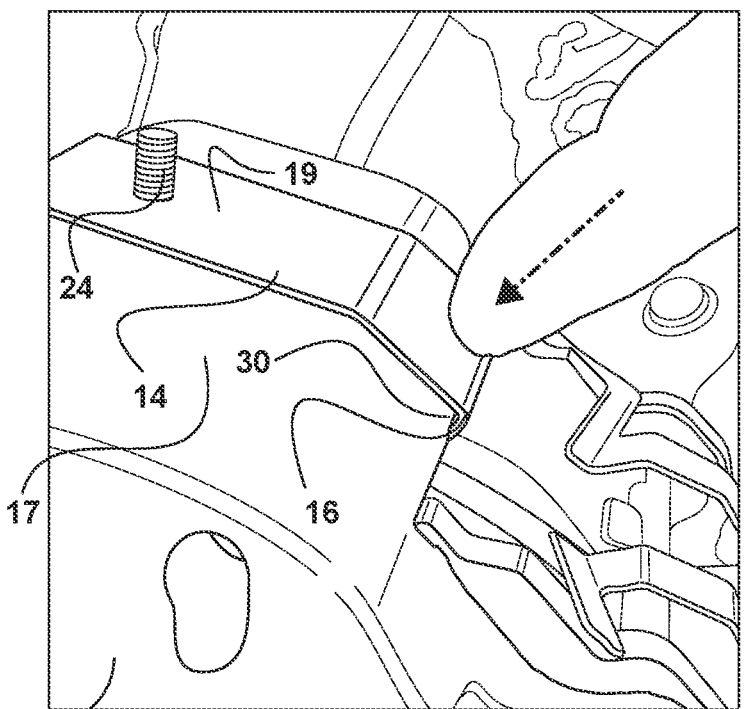
FIG. 3 shows the leading end moved to an engaged position with a caliper where it is in compressive contact upon both the first and second end of the caliper housing, subsequent to pressure exerted by the user to cause a flexing of the body of the mount to enlarge a gap between the trailing end and distal edge.
Figure 4:
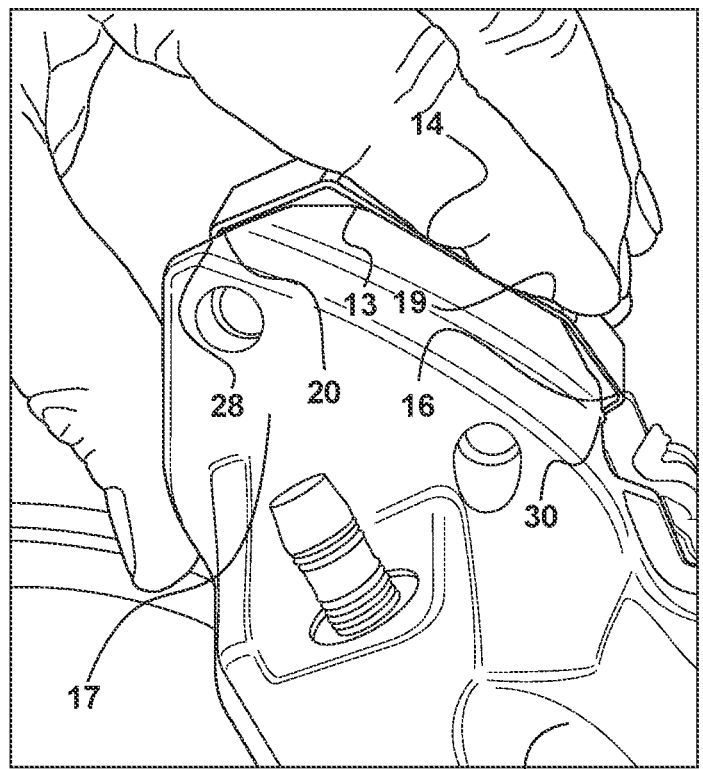
FIG. 4 shows the compressive engagement of the mount upon the housing provided by the flexing body, complementary shape of the facing surface, and C-shape of the trailing end positioned in a first slot between the rotor and housing and the angular or curved shape of the leading end engaged around the housing of the caliper.

Once in this position, as shown in FIG. 3, with the trailing end 20 contacting the caliper 15, if the leading end 16 has not fully slid down into contact with the second end 30 of the caliper 15, a slight pressure upon the central portion 19 of the body 12 of the mount 14 moves it from the preliminary position to the engaged position by actuating the body 12 to bend to flex the leading end 16 to increase the angle thereof. During the pressure actuation, the flexible body 12 assumes a flexed position such as in FIG. 2, where the leading end 16 portion of the body 12 extending from the central portion 19 to the distal edge 18 will deflect temporarily in a direction away from the trailing end 20 and move over and engage upon the second end 30 of the housing of the caliper 15.

Thereafter, pressure-induced actuation of the central portion 19 of the body 12 ceases, and the flexible body will return to a non-flexed original shape. In this non-flexed configuration, such as in FIGS. 3-4, the body 12 of the mount 14 forms a compressive engagement upon the housing of the caliper 15. In this compressive engagement the curved trailing end 20 is in contact with the first end 28 of the housing of the caliper 15 and a portion thereof slides into a first gap between the caliper 15 and a rotor 29. The leading end 16 portion of the body 12 forms a secure biased contact where it is curved around the second end 30 of the housing of the caliper 15 opposite the first end 28 of the caliper 15. Thus, the mount 14 in an engaged position such as in FIG. 3 subsequent to pressure exerted thereon, is placed in a biased compressed engagement with both the first end 28 of the caliper 15 and the second end 30 of the caliper 15.

With the mounts 14 so engaged upon the housing of the caliper 15, the cover plate may be engaged to cover the caliper 15 by engaging mating connectors 24 on the mounts 14 to struts 26 extending from the cover plate 22. Slots 27 may be formed into the struts 26 and the engagement point of the connectors 24 to allow translation of the cover plate 22 from side to side or closer or further from the caliper 15 prior to fixing the connectors 24.

In FIG. 5A is shown the preferred configuration of the device 10 yielding the ease of a sliding no-tool installation of the device 10 preferred in all modes herein. As shown in FIG. 5A and the views in FIG. 6, this is preferred configuration for the mount 14 herein which in all preferred modes herein, is shaped to achieve an easy sliding and subsequent pressure actuated engagement onto the caliper 15 without tools.

As shown in the views of FIG. 5A and FIG. 6, the leading end 16 extends from the central portion 19 of the body 12 of the mount 14, and is configured to slide on the distal edge 18 thereof in a sliding contact with a top of the housing of the caliper 15 during installation. During sliding to the preliminary installation point, this leading end 16 slides upon the housing of the caliper 15 until the trailing end 20 contacts or is adjacent the first end 28 of the caliper 15 which positions the device 10 in the preliminary mounting position.

At this juncture, the body 12 of the mount 14 is actuated to flex by application of pressure to the central portion 19 such as in FIGS. 2-3, which deflects the leading end 16 in a direction away from the second end 30 of the caliper 15, to thereby move the distal edge 18 and leading end 16 around the second end 30 of the caliper 15. The leading end 16, so deflected, during pressure actuation, will slide down the second end 30 of the caliper 15 and thereby achieve the compressive engagement. The connector 24 on the central portion 19 of the body 12, engaged to the mount 14, is also engageable to the struts 26 to hold the cover plate 22 employed herewith. Once so engaged, the cover plate 22, with the struts 26 in a fixed engagement thereto, will hold the two mounts 14 during use.

As shown in the multiple views of FIG. 6 operating the same as that in FIG. 5A and FIG. 1, the leading end 16 portion of the body 12, extending from the central portion 19 of the body 12, extends therefrom at an angle A, for a distance to the distal end 18. There may be one angle A or a plurality of angles A and A1, formed along the section S1 or sections S1 and S2, forming the leading end 16.

Preferably, the section forming part or all of the leading end 16 communication from the angle point such as A1 to the distal edge 18, is at an angle shown as A1, which is equal to or less than 90 degrees relative the imaginary line running through the central portion 19 of the body 12. This positions the section, such as S1, adjacent the distal edge 18 to extend backward toward the trailing end 20, during sliding installation. It forms the gap shown "G" to be slightly smaller than the distance across the intended caliper 15 between the first end 28 and second end 30 thereof.

By forming an angle of the last section, shown as S1, along a line positioning the distal end 18 closer to the trailing end 20 by distance, which is shorter than the actual distance between the first 28 and second ends 30 of the intended caliper 15, the distal end 18 will not extend past the second end 30 during sliding in the mounting procedure until pressure is applied to the body 12 to cause the section S1 to deflect in a direction away from the trailing end 30. This momentarily increases the width of the gap "G" until the distal edge 18 slides down the side of the second end 20 of the caliper 15 to the biased engagement against it.

This angled configuration of the sections S1 and/or S2 adjacent the distal end 18, to provide for easier sliding on the caliper surface 15 during mounting, (versus an angle over 90 degrees relative to the central portion 19), forms the leading end 16 in a manner configured to temporarily deflect away from the trailing end 20 during pressure on the body 12. The leading end 16 will return to a compressive engagement with the caliper 15 once pressure ceases and is, thus, preferred in all modes of the device 10, herein, such as those in FIGS. 7-19, as well as FIG. 5-6.

Figure 7:
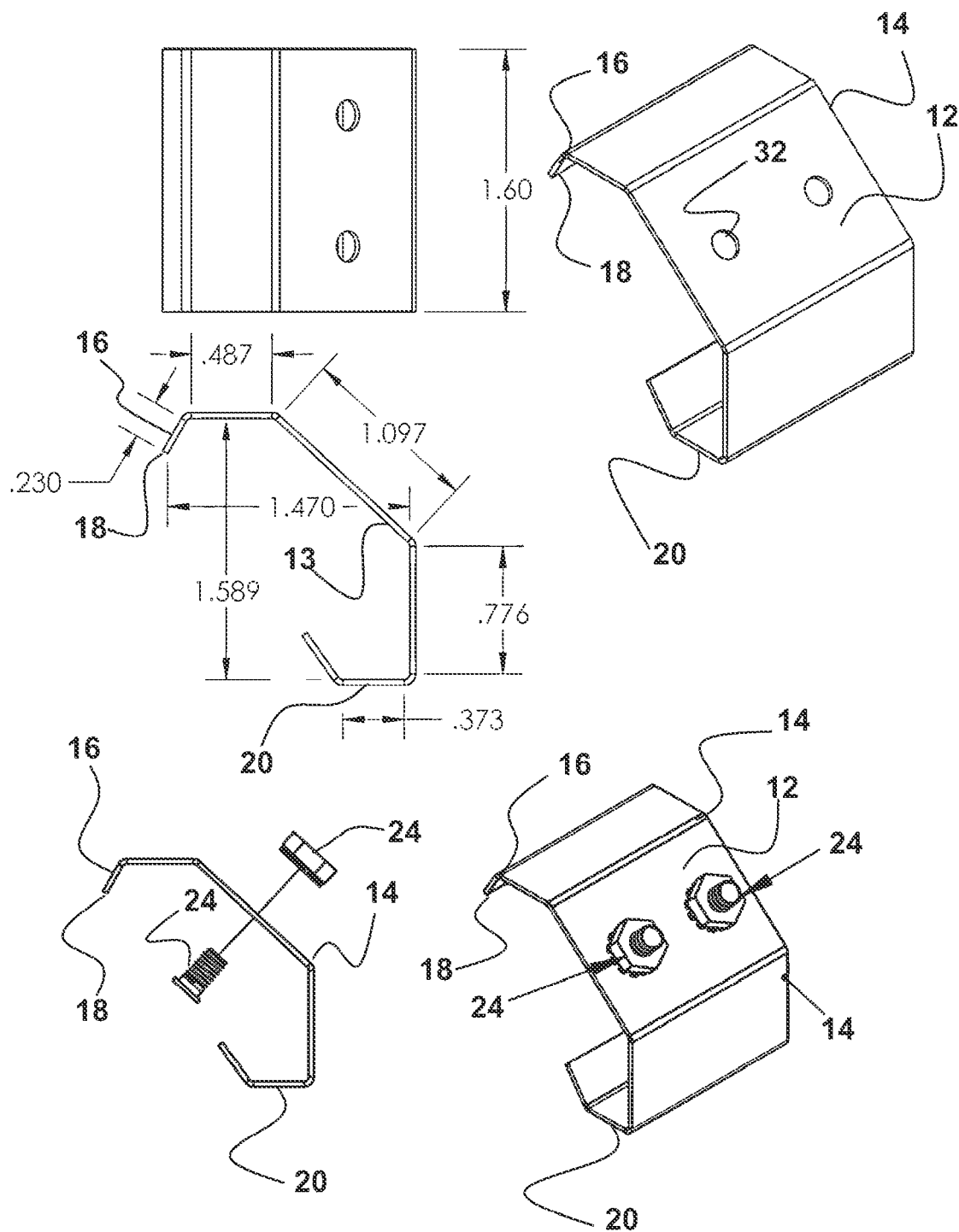
FIG. 7 shows the mount similar in configuration to FIG. 6 but wider and configured for two connectors.

FIG. 7 shows the mount 14 similarly configured to allow the leading end 16 of the mount 14 to slide on the distal edge 18 as the mount 14 is slid upon a housing of the caliper 15. The body of the mount 14 is flexed in a similar fashion as above to position the leading end 16 engaged around the second end of the housing of the caliper 15. Two connectors 24 are shown.

Figure 8:
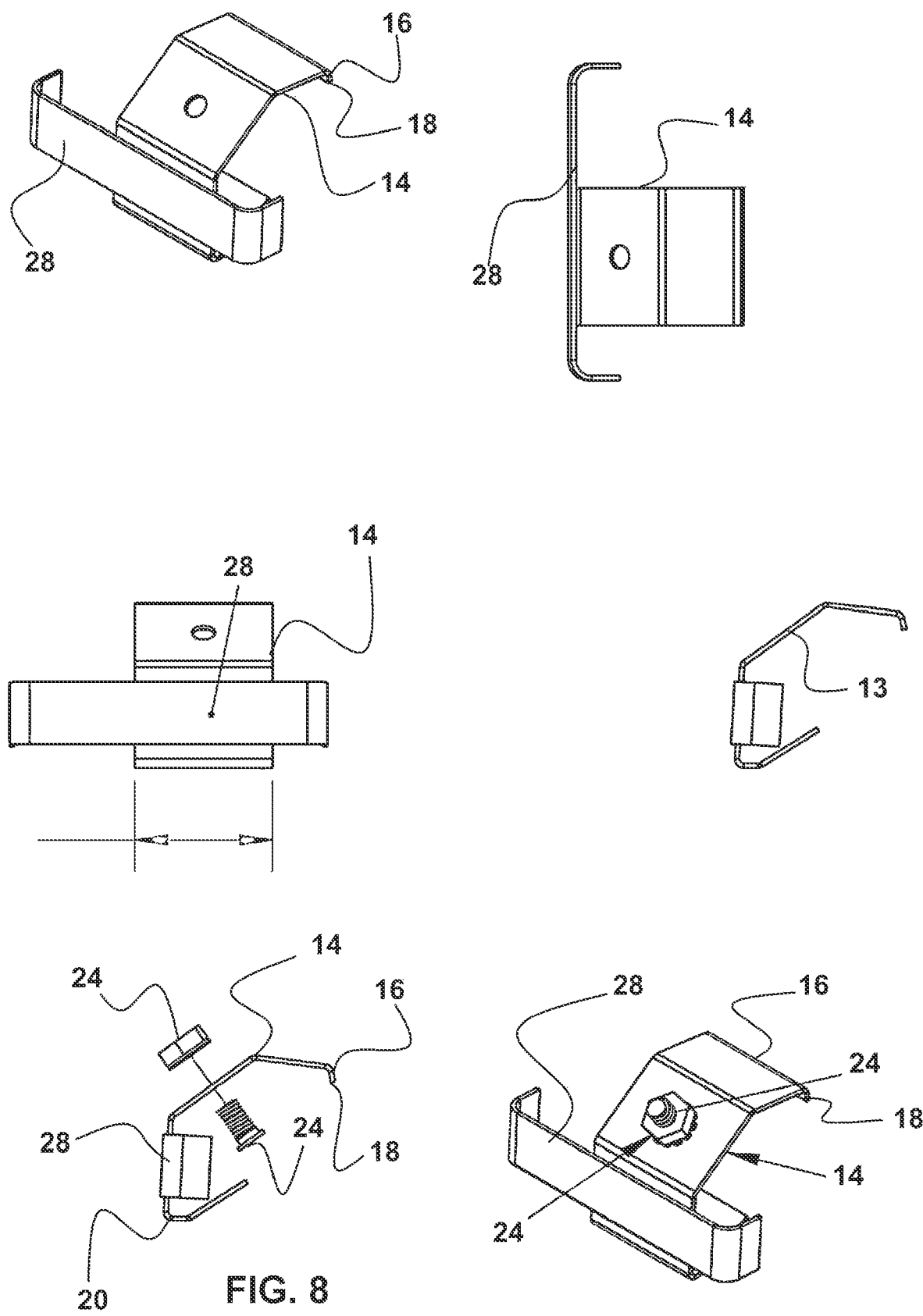
FIG. 8 depicts the mount herein having a body adapted in shape to achieve a sliding engagement with the housing of the caliper and also showing an additional positioning member engaged to the mount which has curved ends for engaging side portions of the housing of the caliper.

In FIG. 8 is shown the mount 14 herein having a body adapted in shape to achieve a sliding engagement with the housing of the caliper 15. Also included are an additional positioning member 28 engaged to the mount 14 which has curved ends for engaging side portions of the housing of the caliper 15.

Figure 9:
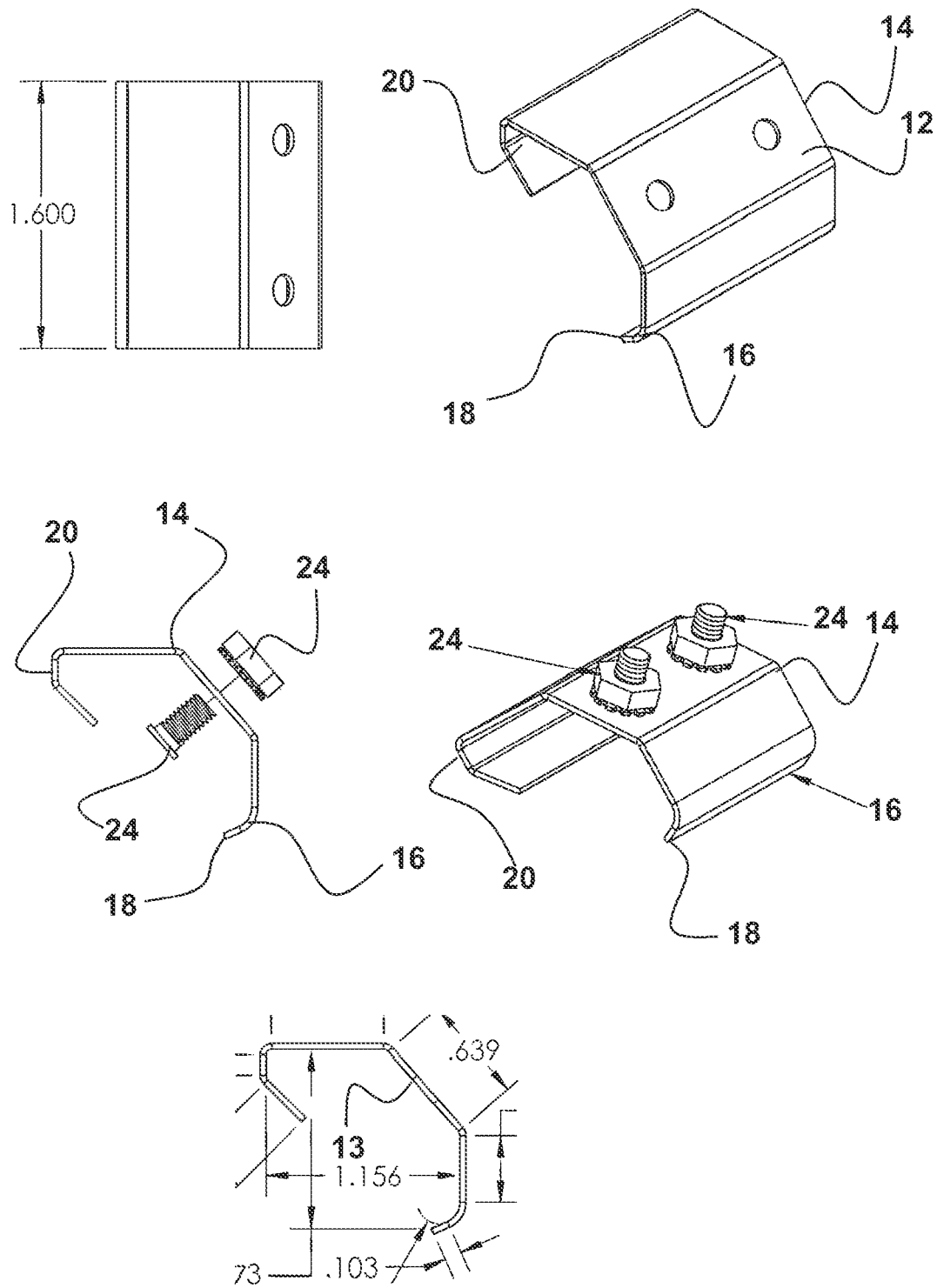
FIG. 9 shows the mount similar in shape to that of FIG. 7 but with dimensions of the angled portions of the mid portion of the body being differently spaced to mirror or form a shape complementary to the exterior of the caliper housing to which it will compressibly engage after a sliding installation and body flex.

Shown in FIG. 9 is the mount 14 similar in shape to that of FIG. 7 but with dimensions of the angled portions of the mid portion of the body 12 being differently spaced to mirror or form a shape complementary to the exterior of the housing of the caliper 15. Subsequent to completion of the sliding engagement and flexing of the mount 14, it is sized to compressibly engage around both sides of the housing of the caliper 15.

Figure 10:
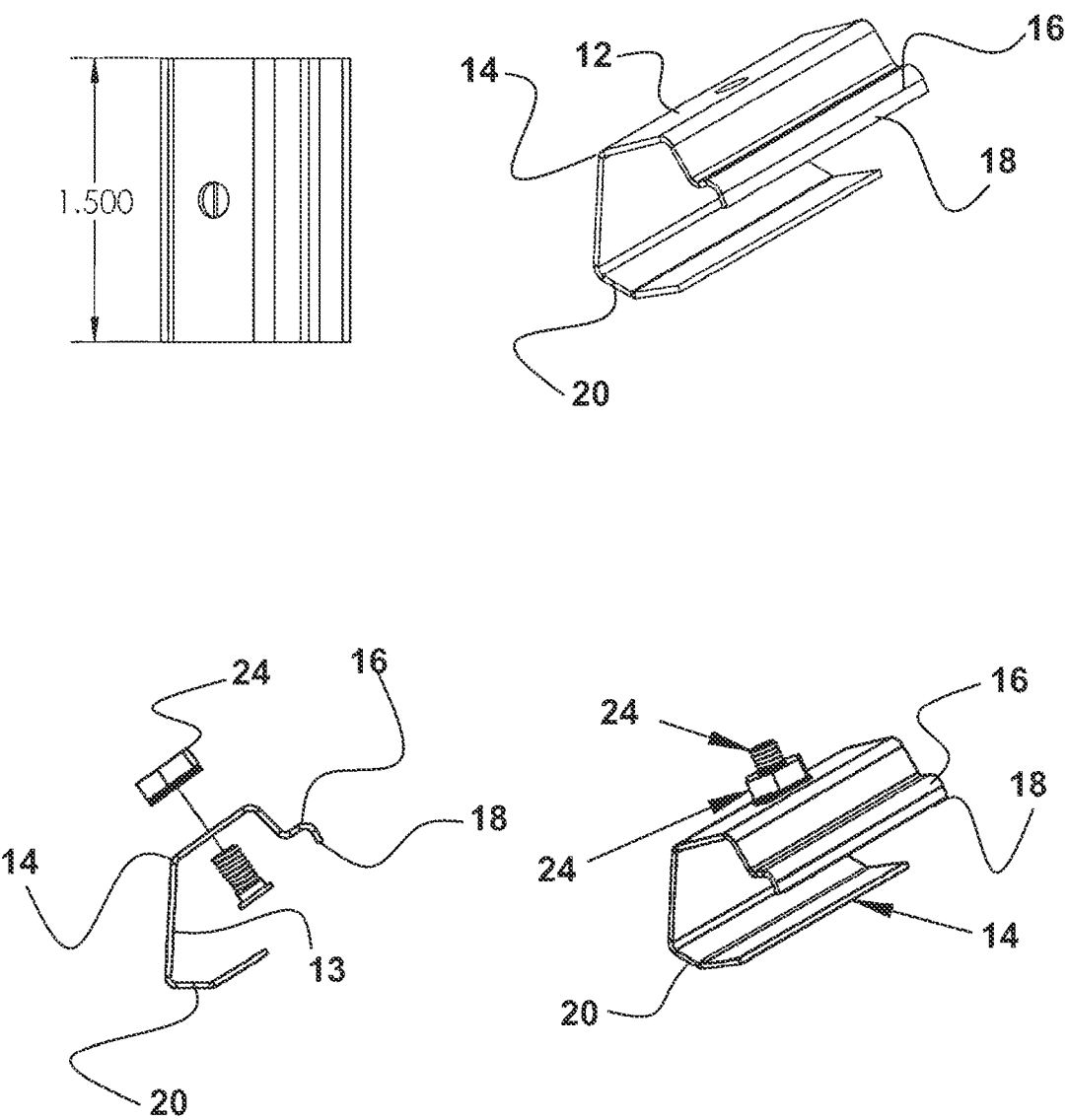
FIG. 10 depicts a body of the mount with differently shaped angled portions thereof which will conform to the exterior of a complementary shaped caliper housing and compressibly engage such after a sliding installation.

Another mode of the mount 14 shaped for sliding engagement upon a housing of a caliper 15 is shown in FIG. 10. The body 12 of the mount 14 has angled portions thereof which along with the leading end 16 and trailing end 20 will conform to the shape and dimensions of the exterior of a complementary shaped housing of a caliper 15. As with all other modes herein, once the mount 14 is slidingly engaged with the distal edge 18 of the leading end 16 sliding on the caliper 15 surface and the body 12 flexed, the mount 14 achieves a compressed engagement on the caliper 15 housing. Connectors 24 can then be employed to engage with the struts 26.

Figure 11:
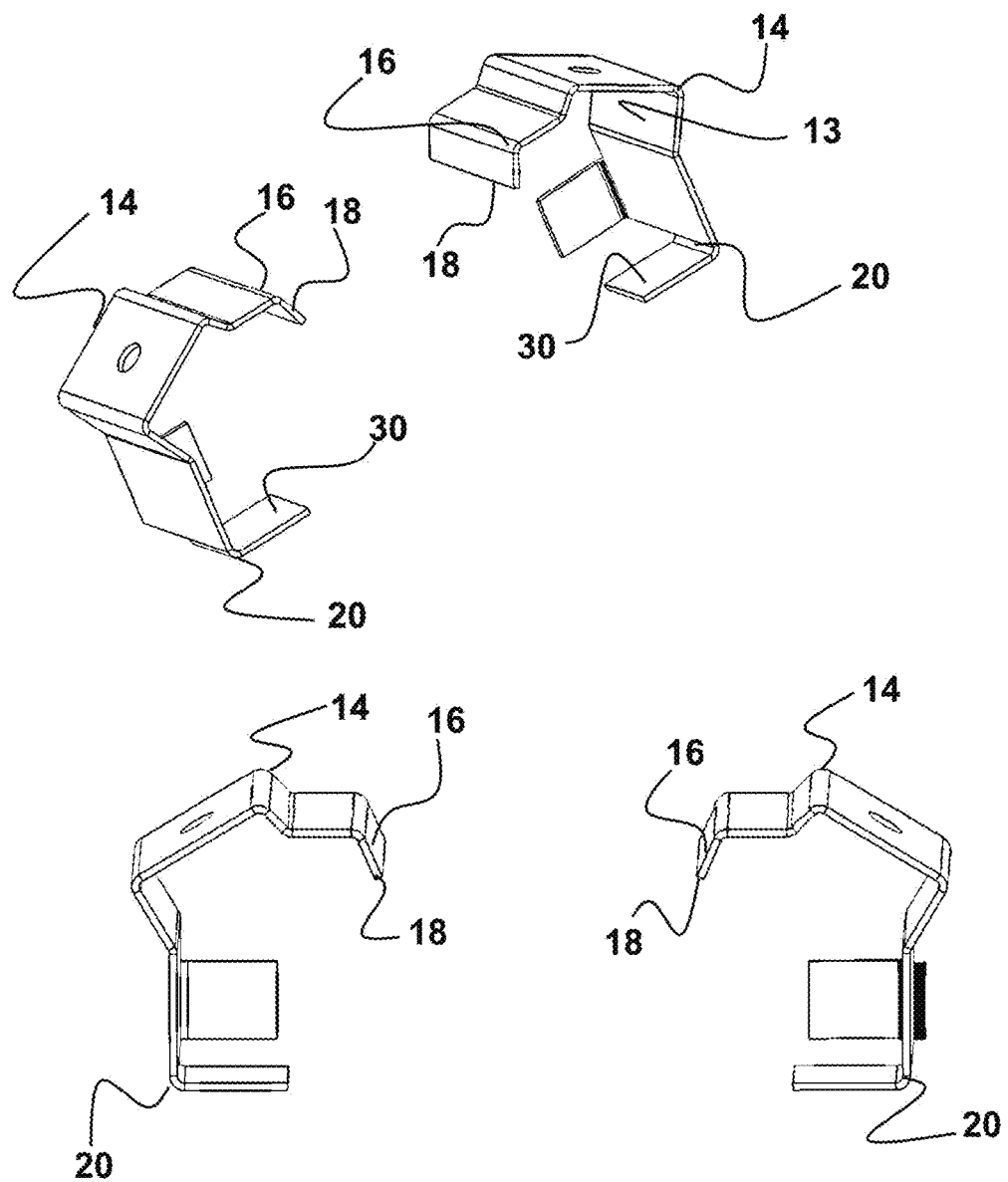
FIG. 11 shows another configuration of the body of the mounts wherein the mid portion is bent with different angled sections and the leading end is configured to slide upon the housing during engagement and also shows a projecting side member for contacting a side surface of the housing.

In FIG. 11 is depicted another configuration of the body 12 of the mount 14 wherein the mid portion is bent with different angled sections and the leading end 16 is configured with a distal edge 18 positioned to contact and slide upon the housing of the caliper 15 during a sliding engagement. Also shown are a projecting side member 30 for contacting a side surface of the housing.

Figure 12:
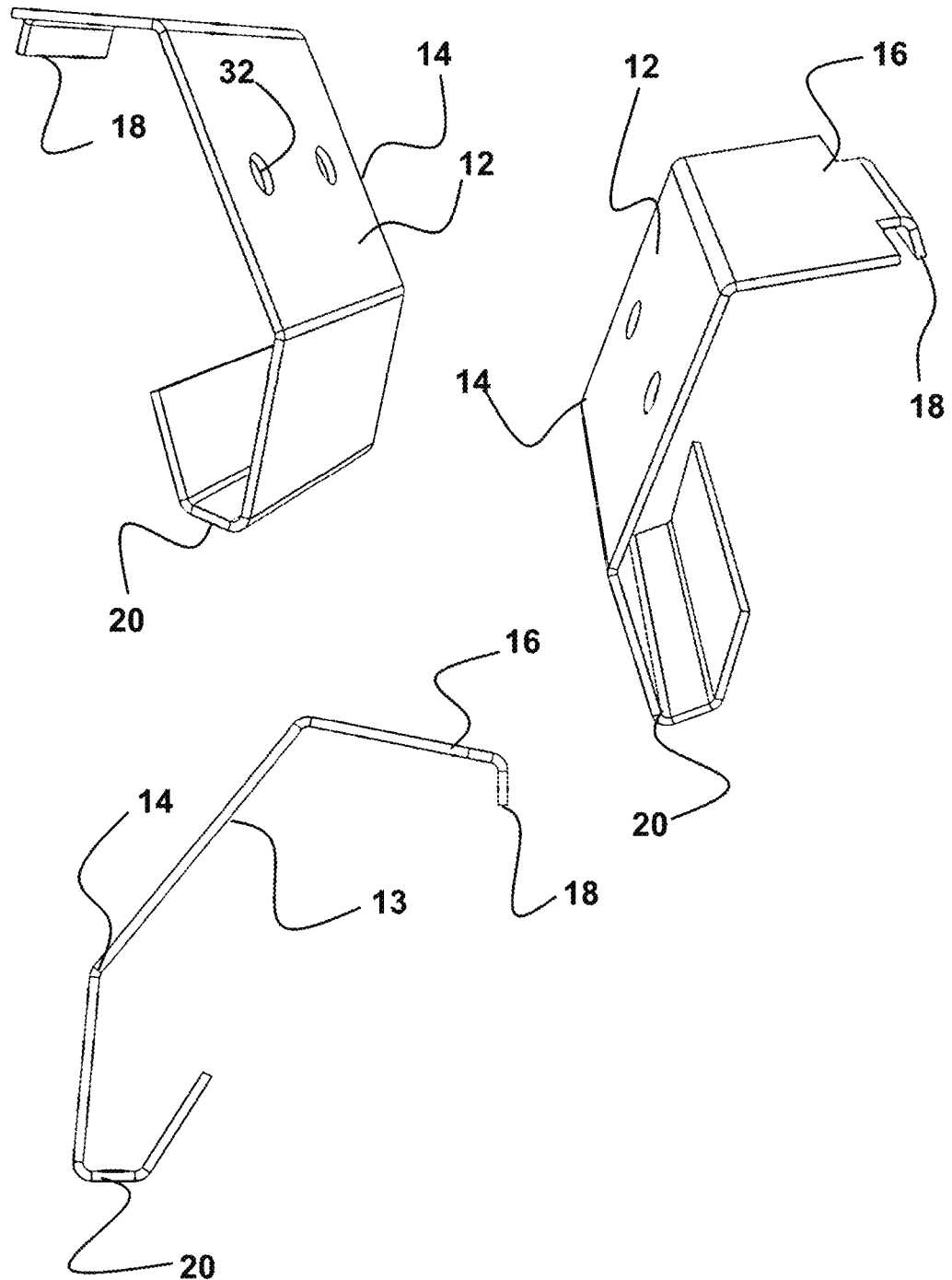
FIG. 12 is another configuration of the mount showing the C-shaped trailing end and a leading end having a width smaller than the width of the mid portion and having two apertures for positioning of connectors therethrough.

FIG. 12 shows views of another configuration of the mount 14 showing the C-shaped trailing end 20 and a leading end 16 having distal edge 18 with a width smaller than the width of the mid portion of the mount 14. Also shown are two apertures 32 for positioning of connectors 24 therethrough.

Figure 13:
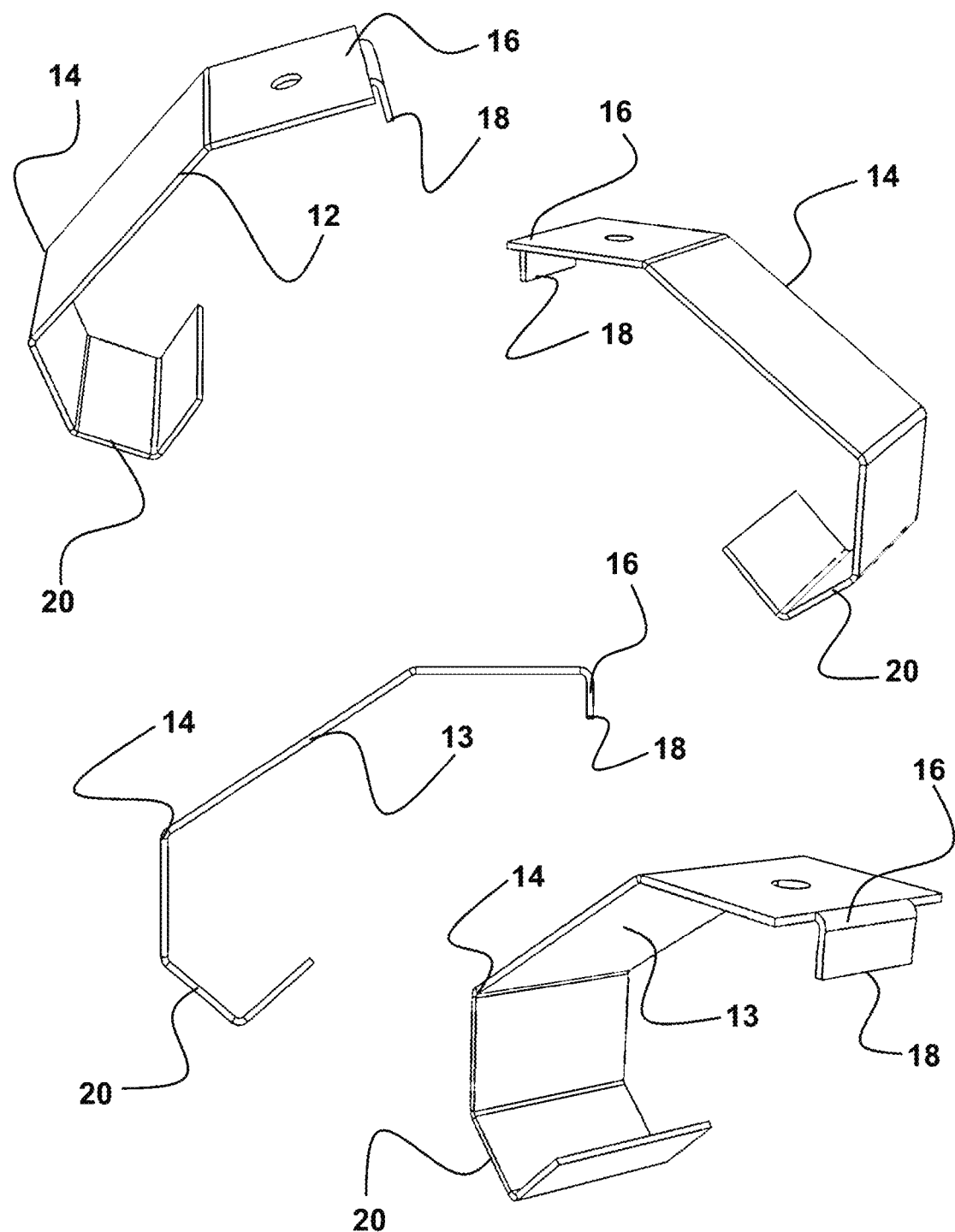
FIG. 13 has a mount body formed to be complementary in shape to the indented exterior surface of a caliper housing and showing the leading end narrower than the mid portion of the body and adapted to slide on the distal edge thereof during installation.

FIG. 13 depicts the mount 14 formed to be complementary in shape to the indented exterior surface of a caliper housing. Also shown is the distal edge 18 of the leading end 16 narrower than the mid portion of the body of the mount 14. So positioned to contact the caliper 15 during a sliding engagement, the distal edge 18 of the leading end 16 will slide on caliper during installation.

Figure 14:
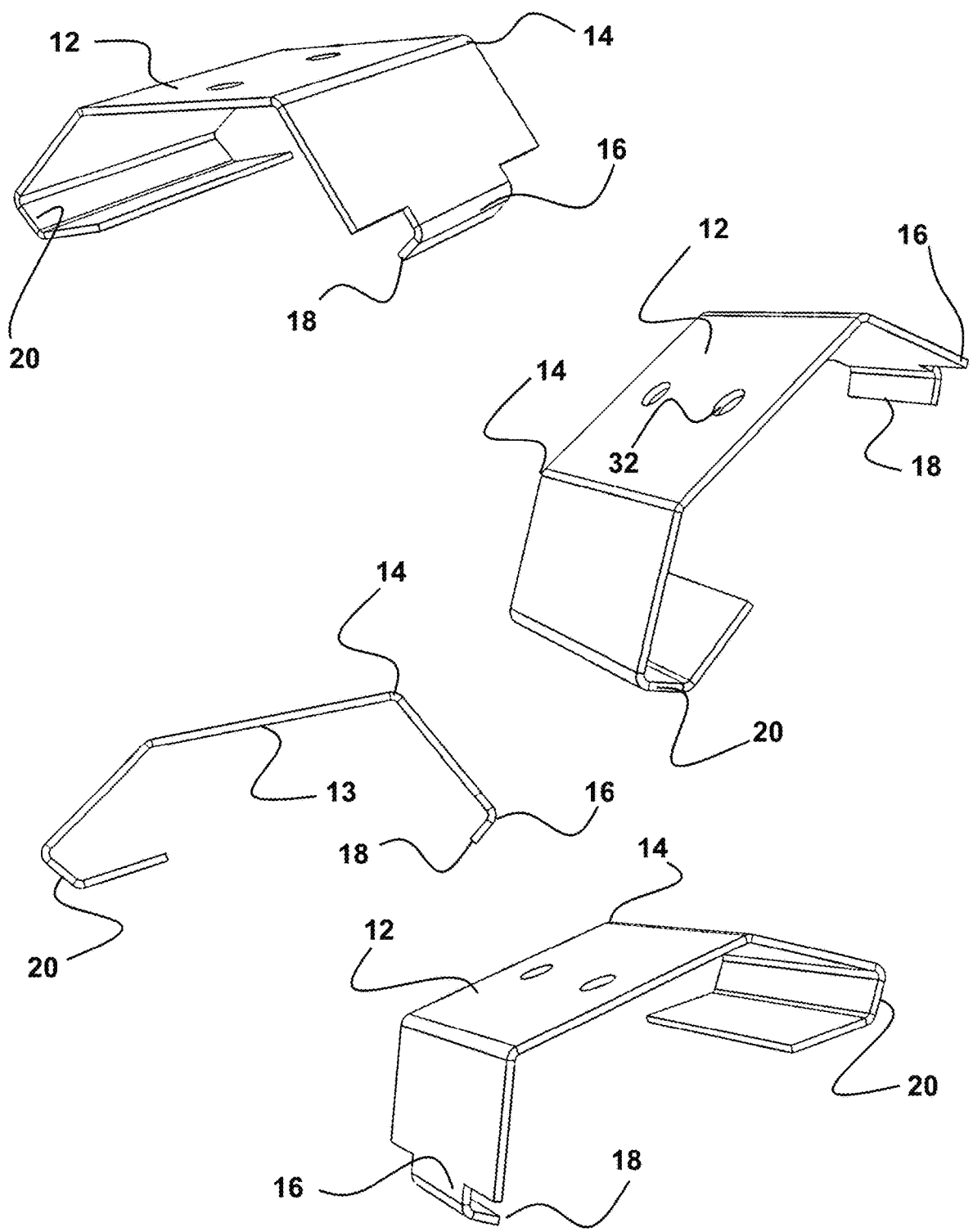
FIG. 14 shows a mount body having an elongated section in the C-shaped trailing end much like the other mounts herein and showing the leading end having a cross section smaller than the mid portion of the body and the distal edge of the leading end positioned for sliding contact during installation and compressive engagement after a flexing of the body.

FIG. 14 shows a mount 14 with a body having an elongated portion in the C-shaped trailing end 20 much like the other mounts 14 herein. Also shown are the leading end 16 having a distal edge 18 angled to contact the surface of the caliper 15 during sliding engagement, which has a cross section smaller than the mid portion of the body 14. One or a plurality of apertures 32 are provided for connectors 24.

Figure 15:
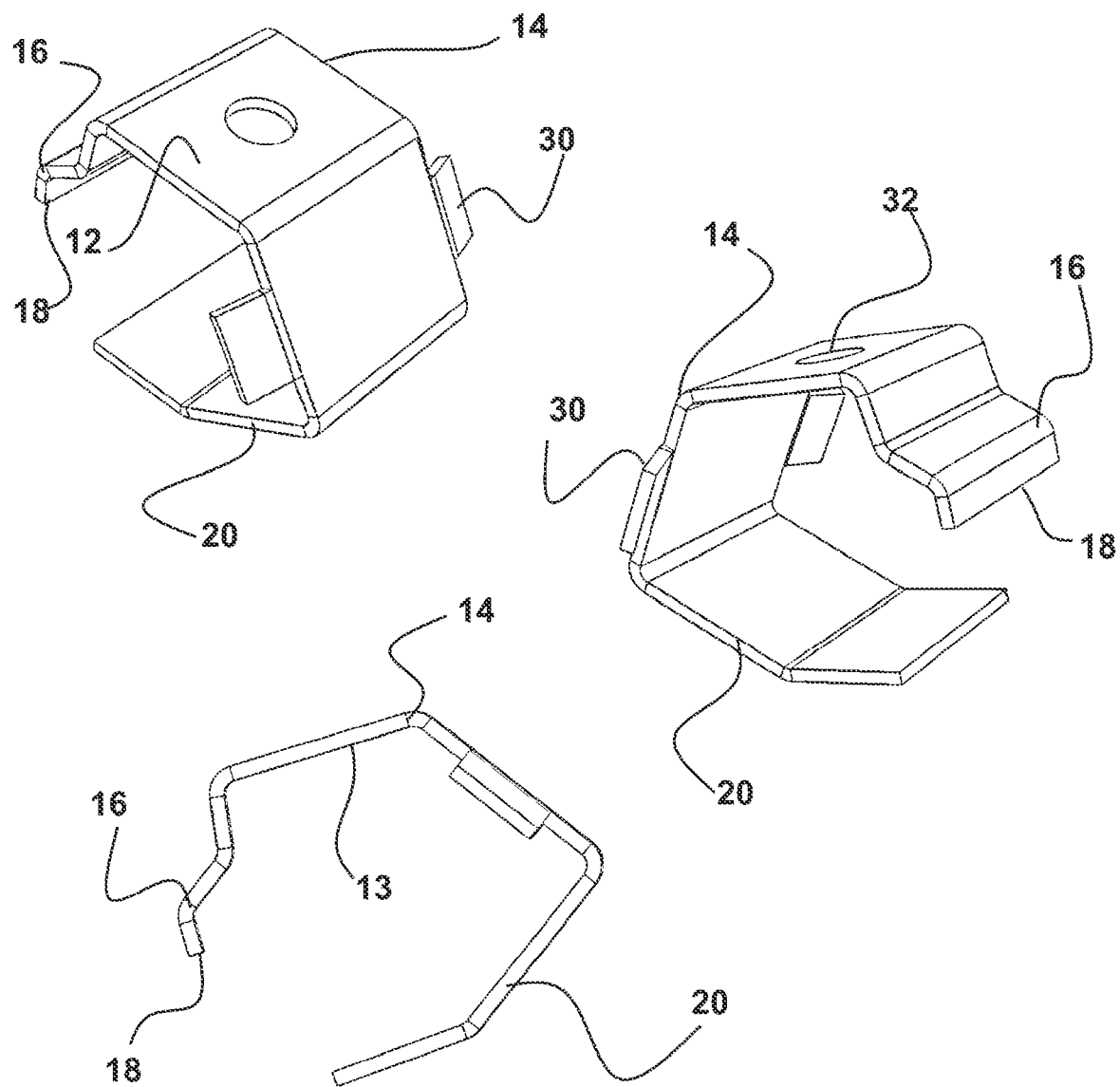
FIG. 15 depicts the mount body herein in another shape forming an interior contact surface which is complementary in shape to the exterior surface of the caliper housing to which it will slidingly engage and flex to a compressive engagement thereon.

FIG. 15 depicts the mount 14 in another shape forming an interior contact surface which is complementary in shape to the exterior surface of the caliper 15 housing to which it will slidingly engage. The distal edge 18 of the leading end 16 is curved and positioned to contact and slide on the caliper 15 housing during installation in the fashion noted herein as with other mounts 14.

Figure 16:
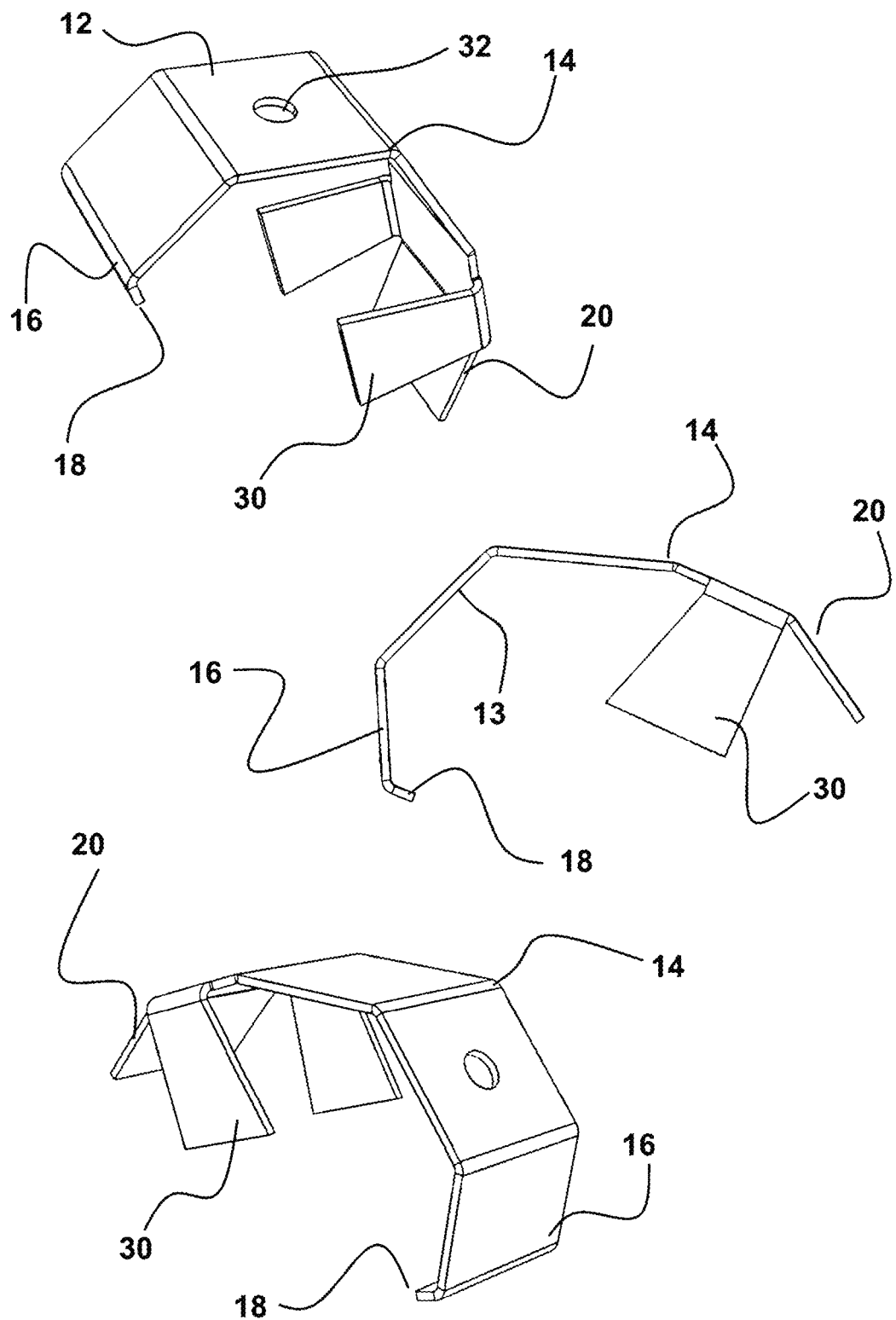
FIG. 16 shows another mount configuration having a trailing end configured to engage under and around a first side of the caliper housing and a leading end shaped to slide upon the housing surface and to compressibly engage subsequent to a flexing of the body.

FIG. 16 shows another mount 14 having a configuration with a trailing end 20 configured to engage under and around a first side of the caliper 15 housing. Also shown are the leading end 15 with a distal edge 18 positioned to contact and slide upon the housing surface during sliding installation noted herein. Subsequent to the flexing of the body, the leading end 16 wraps around and engages the second side of the housing of the caliper 15.

Figure 17:
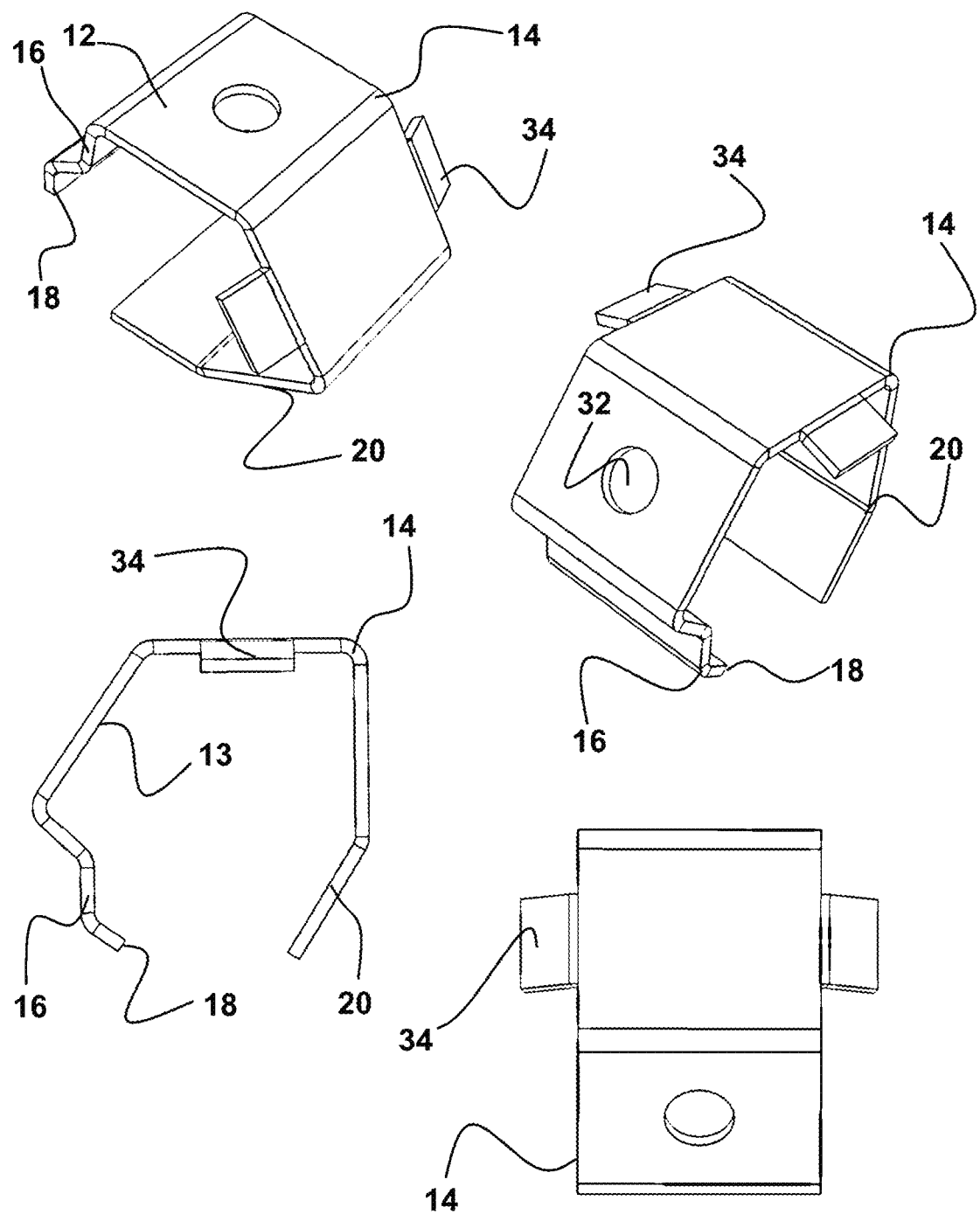
FIG. 17 shows a configuration of the shape of the body of the mount to mirror or conform to the shape of the exterior of the caliper housing to which it engages and shows angular projections shaped and positioned to contact a side surface of the housing when flexed to a compressive engagement thereon.

Depicted in FIG. 17 is another configuration of the mount 14 bent to a shape to mirror or conform to the shape of the exterior of the housing of the caliper 15 to which it engages. Also shown are the leading end 16 shaped to position the distal edge 18 as the contact surface with the caliper 15 during sliding engagement and subsequent flexing. Angular projections 34 shaped and positioned to contact side surface of the caliper 15 housing are included once the body is flexed to form the compressive engagement thereon.

Figure 18:
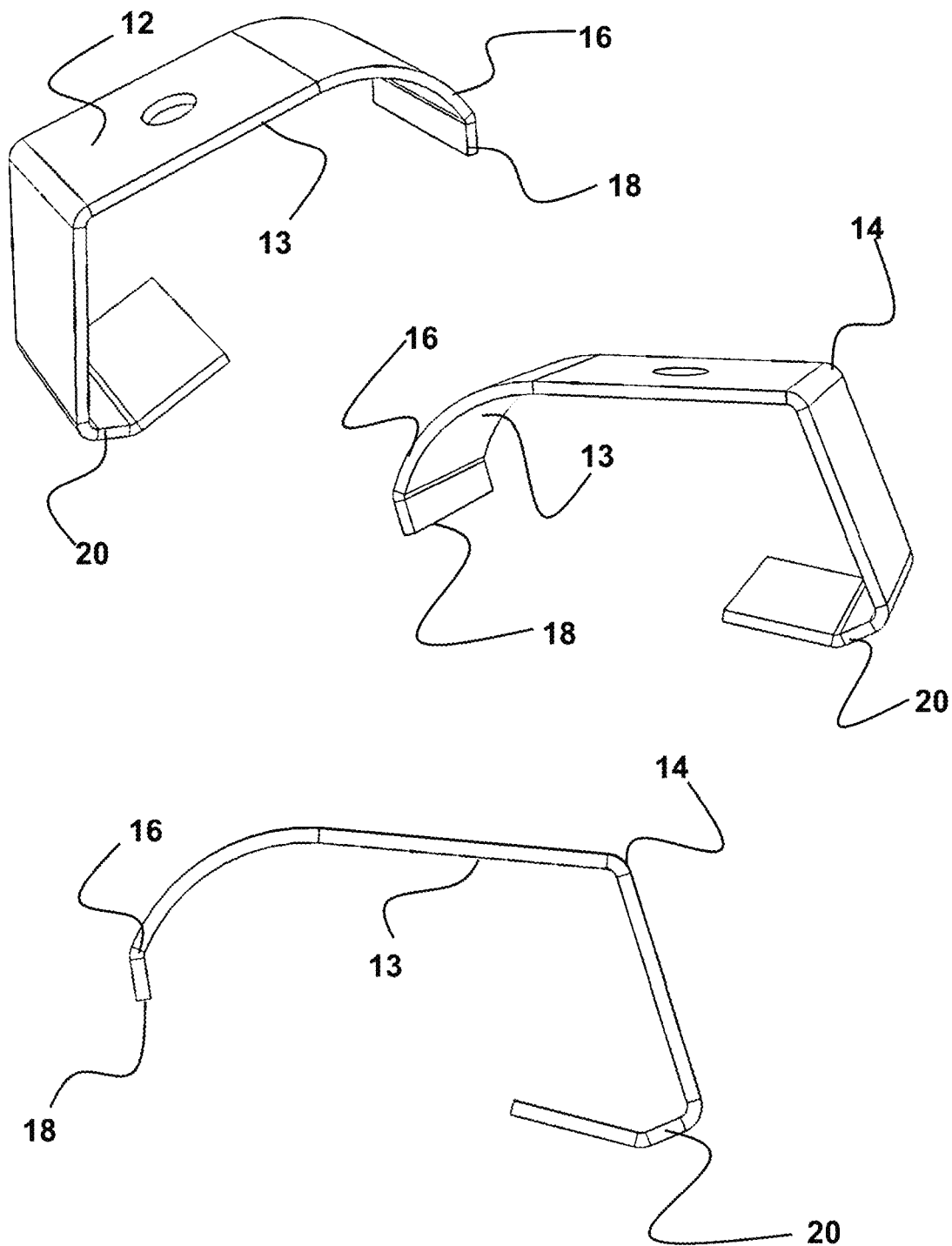
FIG. 18 shows the mount herein where the leading end curves to a distal edge positioned to slide along the surface of the caliper housing while the trailing end engages and to form a compressive engagement subsequent to flexing to allow the leading end to engage.

Another of the different shapes of the mount 14 is shown in FIG. 18 where the leading end 16 curves to a distal edge 18 positioned to slide along the surface of the caliper 15 housing. As with the other mounts 14 herein, once the trailing end 20 contacts the first side of the housing of the caliper 15, the body of the mount 14 is flexed to allow the leading end 16 to wrap around the second end and thereby form a compressive engagement of the mount 14 on the housing of the caliper 15.

Figure 19:
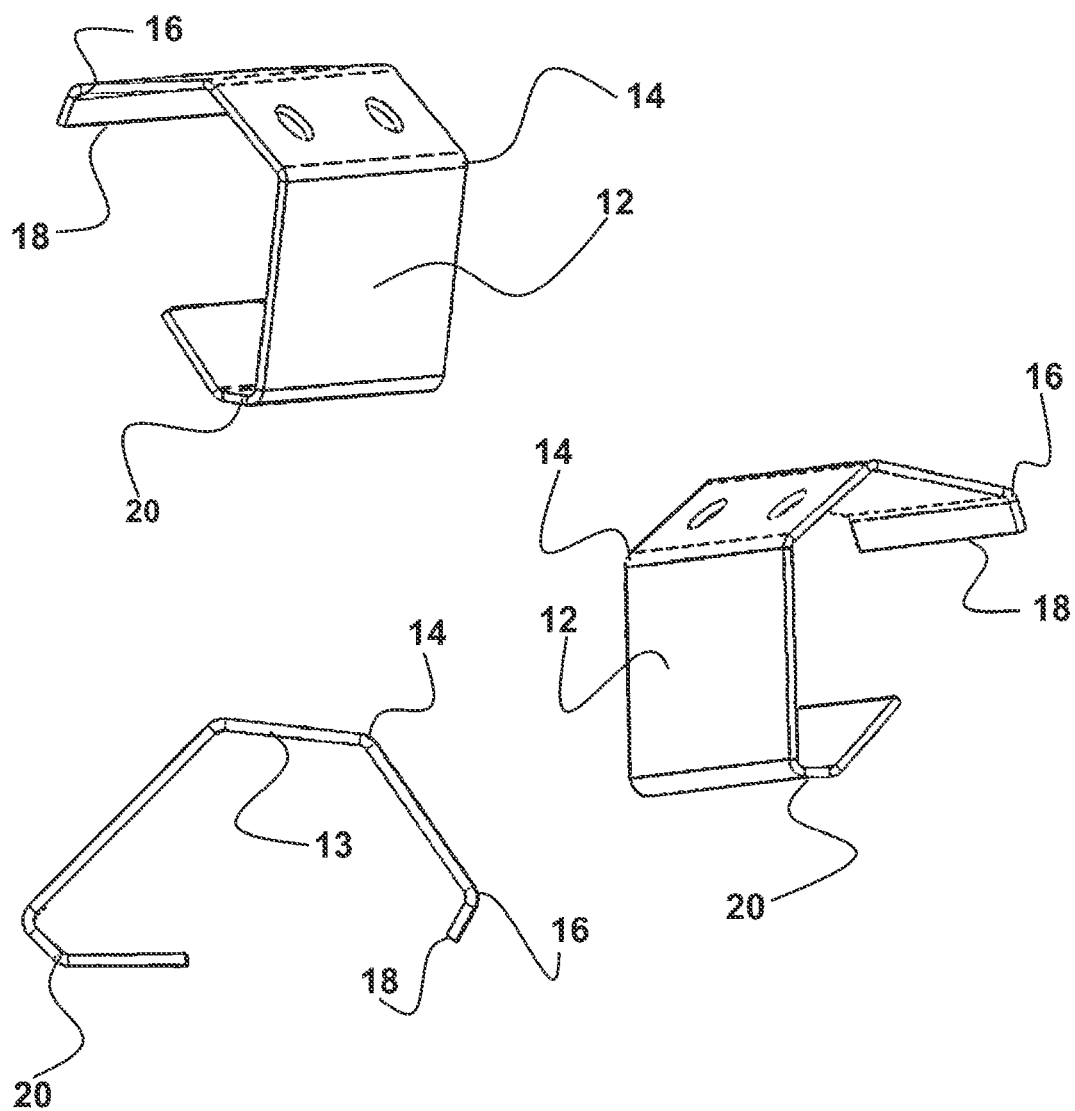
FIG. 19 shows another configuration of the angular portions of the mid portion of the body of the mount which mirror or are complementary to the shape of the caliper housing and shows the distal end of the leading end adapted to slide on the housing while the trailing edge engages.

FIG. 19 shows another configuration of the angular portions of the body of the mount 14 which mirror or are complementary to the shape of the caliper 15 housing to which it engages. Also shown are the distal edge 18 of the leading end 16 adapted to contact and then slide on the surface of the caliper 15 housing until the trailing end contacts the caliper 15 housing and the flex of the body of the mount 14 allows the mount 14 to compressibly engage in the fashion noted with all mount 14 herein.

It is to be understood that elements of different construction and configuration and different steps and process procedures and other arrangements thereof, other than those illustrated and described, may be employed for providing the easily mounted decorative and functional caliper covers herein.

As such, while the present invention has been described herein with reference to particular embodiments thereof, a latitude of modifications, various changes and substitutions are intended in the foregoing disclosure, and it will be appreciated that in some instance some features of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A caliper cover apparatus, comprising:
   a first mount, said first mount having a body extending between a trailing end thereof and a leading end thereof, and having a central portion of said body of said first mount therebetween;
   a second mount, said second mount having a body extending between a trailing end thereof and a leading end thereof, and having a central portion of said body of said second mount therebetween;
   a first connector engaged to said body of said first mount;
   a second connector engaged to said body of said second mount;
   a first gap formed between said trailing end and said leading end of said first mount;
   a second gap formed between said trailing end and said leading end of said second mount;
   said first mount positionable to an engaged position with a first shoulder portion of a brake caliper, where said leading end and said trailing end thereof are biased against opposing sides of said first shoulder portion of said brake caliper;
   said second mount positionable to an engaged position with a second shoulder portion of said brake caliper, where said leading end and said trailing end thereof are biased against opposing sides of said second shoulder portion of said brake caliper;
   a cover plate having a first strut and having a second strut;
   said first strut engageable with a first connector on said body of said first mount; and
   said second strut engageable with a second connector on said body of said second mount.

2. The caliper cover apparatus of claim 1, additionally comprising:
   said body of said first mount formed of flexible metal;
   said body of said second mount formed of flexible metal;
   said first mount being slidable on a top surface of said first shoulder portion of said brake caliper to a first preliminary mount position thereon having a distal edge at said leading end thereof, in contact with said top surface of said first shoulder portion of said brake caliper;
   said second mount being slidable on a top surface of said second shoulder portion of said brake caliper to a second preliminary mount position thereon having a distal edge thereof at said leading end thereof, in contact with said top surface of said second brake caliper;
   said first mount moveable from said first preliminary mount position to said engaged position with said first shoulder portion of said brake caliper, by imparting pressure to said body thereof, to temporarily deflect said distal edge thereof in a direction away from said trailing end thereof; and
   said second mount moveable from said second preliminary mount position to said engaged position with said second shoulder portion of said brake caliper, by imparting pressure to said body thereof, to temporarily deflect said distal edge thereof in a direction away from said trailing end thereof.

3. The caliper cover apparatus of claim 2, additionally comprising:
   said body of said first mount having a body section extending from an angle point on one end of said central portion thereof to said distal end thereof;
   said body of said second mount having a body section extending from an angle point on one end of said central portion thereof, to said distal end thereof;
   said body section of said first mount, extending from said angle point thereof in a direction toward said trailing end of said first mount; and
   said body section of said second mount, extending from said angle point thereof in a direction toward said trailing end of said second mount.

4. The caliper cover apparatus of claim 3, additionally comprising:
   said body section of said first mount extending at an angle between 60 and 90 degrees relative to an imaginary line running through said central portion of said first mount; and
   said body section of said second mount extending at an angle between 60 and 90 degrees relative to an imaginary line running through said central portion of said second mount.

5. The caliper cover apparatus of claim 4 wherein said trailing end of said first mount is substantially C-shaped and said trailing end of said second mount is substantially C-shaped.

6. The caliper cover apparatus of claim 3 wherein said trailing end of said first mount is substantially C-shaped and said trailing end of said second mount is substantially C-shaped.

7. The caliper cover apparatus of claim 2 wherein said trailing end of said first mount is substantially C-shaped and said trailing end of said second mount is substantially C-shaped.

8. The caliper cover apparatus of claim 1, additionally comprising:
   said body of said first mount having a body section extending from an angle point on one end of said central portion thereof to said distal end thereof;
   said body of said second mount having a body section extending from an angle point on one end of said central portion thereof, to said distal end thereof;
   said body section of said first mount, extending from said angle point thereof in a direction toward said trailing end of said first mount; and said body section of said second mount, extending from said angle point thereof in a direction toward said trailing end of said second mount.

9. The caliper cover apparatus of claim 8, additionally comprising:
    said body section of said first mount extending at an angle between 60 and 90 degrees relative to an imaginary line running through said central portion of said first mount; and
    said body section of said second mount extending at an angle between 60 and 90 degrees relative to an imaginary line running through said central portion of said second mount.

10. The caliper cover apparatus of claim 9 wherein said trailing end of said first mount is substantially C-shaped and said trailing end of said second mount is substantially C-shaped.

11. The caliper cover apparatus of claim 8 wherein said trailing end of said first mount is substantially C-shaped and said trailing end of said second mount is substantially C-shaped.

12. The caliper cover apparatus of claim 1 wherein said trailing end of said first mount is substantially C-shaped and said trailing end of said second mount is substantially C-shaped.

\* \* \* \* \*